(12) United States Patent
Huppenthal et al.

(10) Patent No.: US 7,373,440 B2
(45) Date of Patent: May 13, 2008

(54) SWITCH/NETWORK ADAPTER PORT FOR CLUSTERED COMPUTERS EMPLOYING A CHAIN OF MULTI-ADAPTIVE PROCESSORS IN A DUAL IN-LINE MEMORY MODULE FORMAT

(75) Inventors: Jon M. Huppenthal, Colorado Springs, CO (US); Thomas R. Seeman, Colorado Springs, CO (US); Lee A. Burton, Divide, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 881 days.

(21) Appl. No.: 09/932,330

(22) Filed: Aug. 17, 2001

(65) Prior Publication Data

US 2002/0019926 A1  Feb. 14, 2002

Related U.S. Application Data

(60) Continuation-in-part of application No. 09/755,744, filed on Jan. 5, 2001, now abandoned, which is a division of application No. 09/481,902, filed on Jan. 12, 2000, now Pat. No. 6,247,110, which is a continuation of application No. 08/992,763, filed on Dec. 17, 1997, now Pat. No. 6,076,152.

(51) Int. Cl.
*G06F 13/12* (2006.01)
(52) U.S. Cl. .......................... 710/72; 710/62; 710/105; 709/250; 370/463
(58) Field of Classification Search ................ 709/200, 709/225, 250, 214, 215; 710/2, 72, 65, 300, 710/104; 712/11, 23, 20
See application file for complete search history.

(56) References Cited

U.S. PATENT DOCUMENTS 4,783,730 A * 11/1988 Fischer .......................... 710/5

(Continued)

FOREIGN PATENT DOCUMENTS

| EP | 0 571 099 A | 11/1993 |
| JP | 59-206972 | 11/1984 |
| JP | 63-086079 | 4/1988 |

OTHER PUBLICATIONS

Fiscal 1994 Project Portfolio Report, Duane Northcutt, Sun Microsystem, www.research.sun.com/techrep/1994/annualreport94/tcm.html, pp. 1-3.*

(Continued)

*Primary Examiner*—Alford Kindred
*Assistant Examiner*—Eron J. Sorrell
(74) *Attorney, Agent, or Firm*—William J. Kubida; Michael C. Martensen; Hogan & Hartson LLP

(57) ABSTRACT

A switch/network adapter port ("SNAP") for clustered computers employing multi-adaptive processor ("MAP™", a trademark of SRC Computers, Inc.) elements in a dual in-line memory module ("DIMM") or Rambus™ in-line memory module ("RIMM") format to significantly enhance data transfer rates over that otherwise available through use of the standard peripheral component interconnect ("PCI") bus. Particularly disclosed is a microprocessor based computer system utilizing either a DIMM or RIMM physical format processor element for the purpose of implementing a connection to an external switch, network, or other device. In a particular embodiment, connections may be provided to either the PCI, accelerated graphics port ("AGP") or system maintenance ("SM") bus for purposes of passing control information to the host microprocessor or other control chips. The field programmable gate array ("FPGA") based processing elements have the capability to alter data passing through it to and from an external interconnect fabric or device.

24 Claims, 5 Drawing Sheets

U.S. PATENT DOCUMENTS

| | | | | |
|---|---|---|---|---|
| 4,972,457 | A | * | 11/1990 | O'Sullivan ............... 455/556.1 |
| 5,230,057 | A | * | 7/1993 | Shido et al. .................. 712/22 |
| 5,673,204 | A | * | 9/1997 | Klingelhofer ............... 348/578 |
| 5,889,959 | A | * | 3/1999 | Whittaker et al. .......... 709/232 |
| 5,892,962 | A | * | 4/1999 | Cloutier ....................... 712/16 |
| 5,903,771 | A |   | 5/1999 | Sgro et al. |
| 5,915,104 | A | * | 6/1999 | Miller ......................... 710/310 |
| 5,923,682 | A |   | 7/1999 | Seyyedy et al. |
| 6,026,478 | A |   | 2/2000 | Dowling et al. |
| 6,047,343 | A |   | 4/2000 | Olarig et al. |
| 6,052,134 | A | * | 4/2000 | Foster ......................... 345/533 |
| 6,052,773 | A | * | 4/2000 | DeHon et al. ................ 712/43 |
| 6,076,152 | A |   | 6/2000 | Huppenthal et al. |
| 6,108,730 | A | * | 8/2000 | Dell et al. ................... 710/301 |
| 6,148,356 | A | * | 11/2000 | Archer et al. ............... 710/307 |
| 6,192,439 | B1 |   | 2/2001 | Grunewald et al. |
| 6,202,111 | B1 | * | 3/2001 | Wallach et al. ............. 710/302 |
| 6,295,571 | B1 | * | 9/2001 | Scardamalia et al. ....... 710/308 |
| 6,326,973 | B1 | * | 12/2001 | Behrbaum et al. .......... 345/532 |
| 6,452,700 | B1 |   | 9/2002 | Mays, Jr. |
| 6,480,014 | B1 |   | 11/2002 | Li et al. |
| 6,581,157 | B1 | * | 6/2003 | Chiles et al. ................... 713/1 |
| 6,598,199 | B2 | * | 7/2003 | Tetrick ........................ 714/766 |
| 6,633,945 | B1 | * | 10/2003 | Fu et al. ...................... 710/316 |
| 6,799,252 | B1 | * | 9/2004 | Bauman ...................... 711/149 |

OTHER PUBLICATIONS

Yun, Hyun-Kyu and Silverman, H. F.; "A distributed memory MIMD multi-computer with reconfigurable custom computing capabilities", Brown University, Dec. 10-13, 1997, pp. 7-13.

Agarwal, A., et al., "The Raw Compiler Project", pp. 1-12, http://cag-www.lcs.mit.edu/raw, Proceedings of the Second SUIF Compiler Workshop, Aug. 21-23, 1997.

Albaharna, Osama, et al., "On the viability of FPGA-based integrated coprocessors", © 1996 IEEE, Publ. No. 0-8186-7548-9/96, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Video coProcessor", Hot Chips IX, pp. 203-210.

Bertin, Patrice, et al., "Programmable active memories: a performance assessment", © 1993 Massachusetts Institute of Technology, pp. 88-102.

Bittner, Ray, et al., "Computing kernels implemented with a wormhole RTR CCM", © 1997 IEEE, Publ. No. 0-8186-8159-4/97, pp. 98-105.

Buell, D., et al. "Splash 2: FPGAs in a Custom Computing Machine—Chapter 1—Custom Computing Machines: An Introduction", pp. 1-11, http://www.computer.org/espress/catalog/bp07413/spls-ch1.html (originally b lieved published in J. of Supercomputing, vol. IX, 1995, pp. 219-230.

Casselman, Steven, "Virtual Computing and The Virtual Computer", © 1993 IEEE, Publ. No. 0-8186-3890-7/93, pp. 43-48.

Chan, Pak, et al., "Architectural tradeoffs in field-programmable-device-based computing systems", © 1993 IEEE, Publ. No. 0-8186-3890-7/93, pp. 152-161.

Clark, David, et al., "Supporting FPGA microprocessors through retargetable software tools", © 1996 IEEE, Publ. No. 0-8186-7548-9/96, pp. 195-103.

Cuccaro, Steven, et al., "The CM-2X: a hybrid CM-2/Xilink prototype", © 1993 IEEE, Publ. No. 0-8186-3890-7/93, pp. 121-130.

Culbertson, W. Bruce, et al., "Exploring architectures f r volume visualizati n n th Teramac custom computer", © 1996 IEEE, Publ. No. 0-8186-7548-9/96, pp. 80-88.

Culbertson, W. Bruce, et al., "Def ct t l rance n the Teramac custom computer", © 1997 IEEE, Publ. No. 0-8186-8159-4/97, pp. 116-123.

Dehon, Andre, "DPGA-Coupled microprocessors: commodity IC for the early $21^{st}$ century", © 1994 IEEE, Publ. No. 0-8186-5490-2/94, pp. 31-39.

Dehon, A., et al., "MATRIX A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. N . 0-8186-5490-2/94, pp. 72-81.

Elliott, Duncan, et al., "Computational Ram: a memory-SIMD hybrid and its application to DSP", © 1992 IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernard, et al., "Assessing Document Relevance with Run-Time Reconfigurable Machin s", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al. "A General Approach in System Design Integrating Reconfigurable Accel rators," http://xputers.informatik.uni-kl.de/papers/paper026-1.html, IEEE 1996 Conference, Austin, TX, Oct. 9-11, 1996.

Hartenstein, Reiner, et al., "A reconfigurable data-driven ALU for Xputers", © 1994 IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1986 IEEE, Publ. No. 0272-1732/86/1000-0006, pp. 6-17.

Herpel, H. -J., et al., "A Reconfigurable Computer for Embedded Control Applications", © 1993 IEEE, Publ. No. 0-8186-3890-7/93, pp. 111-120.

Hogl, H., et al., "Enable++: A second generation FPGA processor", © 1995 IEEE, Publ. No. 0-8186-7086-X/95, pp. 45-53.

King, William, et al., "Using MORRPH in an industrial machine vision system". © 1996 IEEE, Publ. No. 08186-7548-9/96, pp. 18-26.

Manohar, Swaminathan, et al., "A pragmatic approach to systolic design", © 1988 IEEE, Publ. No. CH2603-9/88/0000/0463, pp. 463-472.

Mauduit, Nicolas, et al., "Lneuro 1.0: a piece of hardware LEGO for building neural network systems," © 1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "MATRIX: A Reconfigurable Computing Architecture with Configurable Instruction Distribution and Deployable Resources", © 1996 IEEE, Publ. No. 0-8186-7548-9/96, pp. 157-166.

Morley, Robert E., Jr., et al., "A Massively Parallel Systolic Array Processor System", © 1988 IEEE, Publ. N . CH2603-9/88/0000/0217, pp. 217-225.

Patterson, David, et al., "A case for intelligent DRAM: IRAM", Hot Chips VIII, Aug. 19-20, 1996, pp. 75-94.

Peterson, Janes, et al., "Scheduling and partitioning ANSI-C programs ont multi-FPGA CCM architectures", © 1996 IEEE, Publ. No. 0-8186-7548-9/96, pp. 178-187.

Schmit, Herman, "Incremental reconfiguration for pipelined applications," © 1997 IEEE, Publ. No. 0-8186-8159-4/97, pp. 47-55.

Sitkoff, Nathan, t al., "Implem nting a Genetic Algorithm n a Parall l Cust m Computing Machine", Publ. No. 0-8186-7086-X/95, pp. 180-187.

Stone, Harold, "A logic-in-memory computer", © 1970 IEEE, IEEE Transactions on Computers, pp. 73-78, Jan. 1990.

Tangen, Uwe, et al., "A parallel hardware evolvable computer POLYP extended abstract", © 1997 IEEE, Publ. No. 0-8186-8159/4/97, pp. 238-239.

Thornburg, Mike, et al., "Transformable Computers", © 1994 IEEE, Publ. No. 0-8186-5602-6/94, pp. 674-679.

Tomita, Shinji, et al., "A computer low-level parallelism QA-2", © 1986 IEEE, Publ. No. 0-0384-7495/86/0000/0280, pp. 280-289.

Trimberger, Steve, et al., "A time-multiplexed FPGA", © 1997 IEEE, Publ. No. 0-8186-8159-4/97, pp. 22-28.

Ueda, Hirotada, et al., "A multiprocessor system utilizing enhanced DSP's for image processing", © 1988 IEEE, Publ. No. CH2603-9/88/0000/0611, pp. 611-620.

Villasenor, John, et al., "Configurable computing", © 1997 Scientific American, Jun. 1997.

Wang, Quiang, et al., "Automated field-programmable compute accelerator design using partial evaluation", © 1997 IEEE, Publ. No. 0-8186-8159-4/97, pp. 145-154.

W.H. Mangione-Smith and B.L. Hutchings. Configurable computing: The Road Ahead. In Proceedings of the Reconfigurable Architectures Workshop (RAW'97), pp. 81-96, 1997.

Wirthlin, Michael, et al., "The Nano processor: a low resource reconfigurable processor", © 1994 IEEE, Publ. No. 0-8186-5490-2/94, pp. 23-30.

Wirthlin, Michael, et al., "A dynamic instruction set computer", © 1995 IEEE, Publ. No. 0-8186-7086-X/95, pp. 99-107.

Wittig, Ralph, et al., "One Chip: an FPGA processor with reconfigurable logic", © 1996 IEEE, Publ. No. 0-8186-7548-9/96, pp. 126-135.

Yamauchi, Tsukasa, et al., "SOP: A reconfigurable massively parallel system and its control-data flow based compiling method", © 1996 IEEE, Publ. No. 0-8186-7548-9/96, pp. 148-156.

"Information Brief", PCI Bus Technology, © IBM Personal Computer Company, 1997, pp. 1-3.

* cited by examiner

SWITCH/NETWORK ADAPTER PORT FOR CLUSTERED COMPUTERS EMPLOYING A CHAIN OF MULTI-ADAPTIVE PROCESSORS IN A DUAL IN-LINE MEMORY MODULE FORMAT

CROSS REFERENCE TO RELATED PATENT APPLICATIONS

The present invention is a continuation-in-part patent application of U.S. patent application Ser. No. 09/755,744 filed Jan. 5, 2001 now abandoned which is a divisional patent application of U.S. patent application Ser. No. 09/481,902 filed Jan. 12, 2000, now U.S. Pat. No. 6,247,110, which is a continuation of U.S. patent application Ser. No. 08/992,763 filed Dec. 17, 1997 for: "Multiprocessor Computer Architecture Incorporating a Plurality of Memory Algorithm Processors in the Memory Subsystem", now U.S. Pat. No. 6,076,152, assigned to SRC Computers, Inc., Colorado Springs, Colo., assignee of the present invention, the disclosures of which are herein specifically incorporated by this reference.

BACKGROUND OF THE INVENTION

The present invention relates, in general, to the field of computer architectures incorporating multiple processing elements. More particularly, the present invention relates to a switch/network adapter port ("SNAP") for clustered computers employing a chain of multi-adaptive processors ("MAP™", a trademark of SRC Computers, Inc.) in a dual in-line memory module ("DIMM") format to significantly enhance data transfer rates over that otherwise available from the peripheral component interconnect ("PCI") bus.

Among the most currently promising methods of creating large processor count, cost-effective computers involves the clustering together of a number of relatively low cost microprocessor based boards such as those commonly found in personal computers ("PCs"). These various boards are then operated using available clustering software to enable them to execute, in unison, to solve one or more large problems. During this problem solving process, intermediate computational results are often shared between processor boards.

Utilizing currently available technology, this sharing must pass over the peripheral component interconnect ("PCI") bus, which is the highest performance external interface bus, commonly found on today's PCs. While there are various versions of this bus available, all are limited to less than 1 GB/sec. bandwidth and, because of their location several levels of chips below the processor bus, they all exhibit a very high latency. In low cost PCs, this bus typically offers only on the order of 256 MB/sec. of bandwidth.

These factors, both individually and collectively can significantly limit the overall effectiveness of the cluster and, if a faster interface could be found, the ability of clusters to solve large problems would be greatly enhanced. Unfortunately, designing a new, dedicated chip set that could provide such a port is not only very expensive, it would also have to be customized for each type of clustering interconnect encountered. This would naturally lead to relatively low potential sale volumes for any one version of the chipset, thus rendering it cost ineffective.

SUMMARY OF THE INVENTION

In accordance with the technique of the present invention a system and method is provided which enables an existing, standard PC memory bus to be utilized in conjunction with a multi-adaptive processor ("MAP™", a trademark of SRC Computers, Inc.) to solve this data transfer rate problem in a universally applicable way. To this end, disclosed herein is a switch/network adapter port for clustered computers employing a chain of multi-adaptive processors in a DIMM format to significantly enhance data transfer rates over that otherwise available from the PCI bus.

One of the most commonly used memory formats in PCs today is the dual inline memory module ("DIMM") format. These modules are presently available in what is called a double data rate ("DDR") format and PCs using this format incorporate a memory bus that can provide up to 1.6 GB/sec. of bandwidth today. In the near future, this bus will be further expanded to support quad data rate ("QDR") DIMMs having up to 3.2 GB/sec. of bandwidth. A currently available alternative form of memory is the Rambus DIMM ("RIMM"). The basic features of RIMM are similar to that of the standard DIMM so, for purposes of the preceding discussion and ensuing disclosure, the term DIMM shall be utilized to denote both forms of memory.

Since the DIMM memory comprises the primary storage location for the PC microprocessor, it is designed to be electrically very "close" to the processor bus and thus exhibit very low latency and it is not uncommon for the latency associated with the DIMM to be on the order of only 25% of that of the PCI bus. By, in essence, harnessing this bandwidth as an interconnect between computers, greatly increased cluster performance may be realized.

To this end, by placing a MAP element (in, for example, a DIMM physical format) in one of the PC's DIMM slots, it's field programmable gate array ("FPGA") could accept the normal memory "read" and "write" transactions and convert them to a format used by an interconnect switch or network.

As disclosed in the aforementioned patents and patent applications, each MAP element may include chain ports to enable it to be coupled to other MAP elements. Through the utilization of the chain port to connect to the external clustering fabric, data packets can then be sent to remote nodes where they can be received by an identical board. In this particular application, the MAP element would extract the data from the packet and store it until needed by the receiving processor.

This technique results in the provision of data transfer rates several times higher than that of any currently available PC interface. However, the electrical protocol of the DIMMs is such that once the data arrives at the receiver, there is no way for a DIMM module to signal the microprocessor that it has arrived, and without this capability, the efforts of the processors would have to be synchronized through the use of a continued polling of the MAP elements to determine if data has arrived. Such a technique would totally consume the microprocessor and much of its bus bandwidth thus stalling all other bus agents.

To avoid this situation, the DIMM MAP element may be further provided with a connection to allow it to communicate with the existing PCI bus and could then generate communications control packets and send them via the PCI bus to the processor. Since these packets would account for but a very small percentage of the total data moved, the low bandwidth effects of the PCI bus are minimized and conventional PCI interrupt signals could also be utilized to inform the processor that data has arrived. In accordance with another implementation of the present invention, the system maintenance ("SM") bus could also be used to signal the processor. The SM bus is a serial current mode bus that conventionally allows various devices on the processor board to interrupt the processor.

With a MAP element associated with what might be an entire DIMM slot, the PC will allocate a large block of addresses, typically on the order of 1 GB, for use by the MAP element. While some of these can be decoded as commands, (as disclosed in the aforementioned patents and patent applications) many can still be used as storage. By having at least as many address locations as the normal input/output ("I/O") block size used to transfer data from peripherals, the conventional Intel™ chip sets used in most PCs will allow direct I/O transfers into the MAP element. This then allows data to arrive from, for example, a disk and to pass directly into a MAP element. It then may be altered in any fashion desired, packetized and transmitted to a remote node. Because both the disk's PCI port and the MAP element DIMM slots are controlled by the PC memory controller, no processor bus bandwidth is consumed by this transfer.

It should also be noted that in certain PCs, several DIMMs may be interleaved to provide wider memory access capability in order to increase memory bandwidth. In these systems, the previously described technique may also be utilized concurrently in several DIMM slots. Nevertheless, regardless of the particular implementation chosen, the end result is a DIMM-based MAP element having one or more connections to the PCI bus and an external switch or network which results in many times the performance of a PCI-based connection alone as well as the ability to process data as it passes through the interconnect fabric.

Particularly disclosed herein is a microprocessor based computer system utilizing either a DIMM or RIMM based MAP element for the purpose of implementing a connection to an external switch, network, or other device. Further disclosed herein is a DIMM or RIMM based MAP element having connections to the either the PCI or SM bus for purposes of passing control information to the host microprocessor or other control chips. Still further disclosed herein is a DIMM or RIMM based MAP element having the capability to alter data passing through it to and from an external interconnect fabric or device.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF AN EXEMPLARY EMBODIMENT

Figure 1:
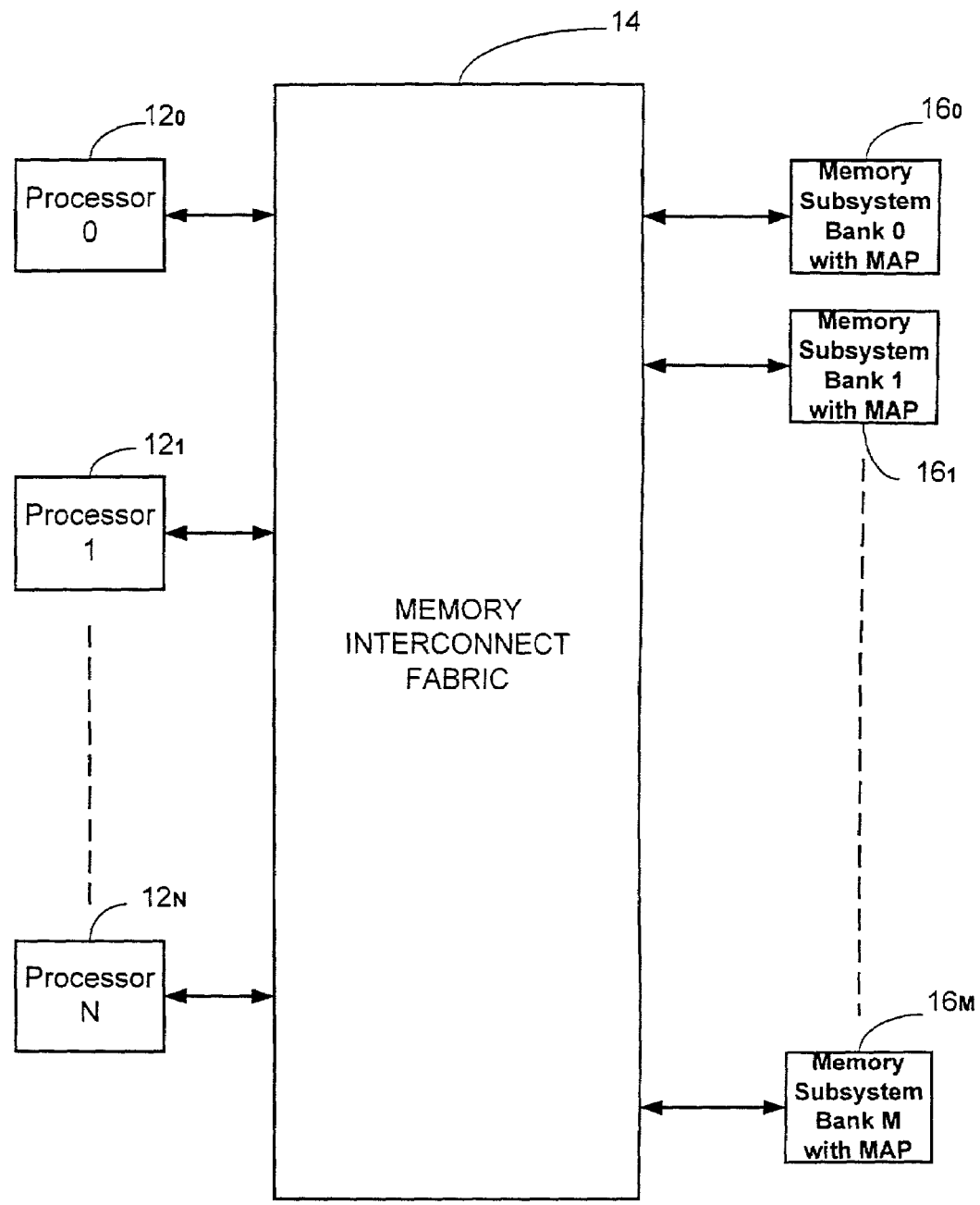
FIG. 1 is a simplified, high level, functional block diagram of a multiprocessor computer architecture employing multi-adaptive processors ("MAP") in accordance with the disclosure of the aforementioned patents and patent applications in a particular embodiment wherein direct memory access ("DMA") techniques may be utilized to send commands to the MAP elements in addition to data.

With reference now to FIG. 1, a multiprocessor computer 10 architecture in accordance with the disclosures of the foregoing patents and patent applications is shown. The multiprocessor computer 10 incorporates N processors $12_0$ through $12_N$ which are bi-directionally coupled to a memory interconnect fabric 14. The memory interconnect fabric 14 is then also coupled to M memory banks comprising memory bank subsystems $16_0$ (Bank 0) through 16M (Bank M). A number of multi-adaptive processor elements ("MAP™") 112 (as shown with more particularity in the following figure) are associated with one or more of the memory banks 16. The MAP elements 112 may include chain ports as also disclosed in the aforementioned patents and patent applications.

Figure 2:
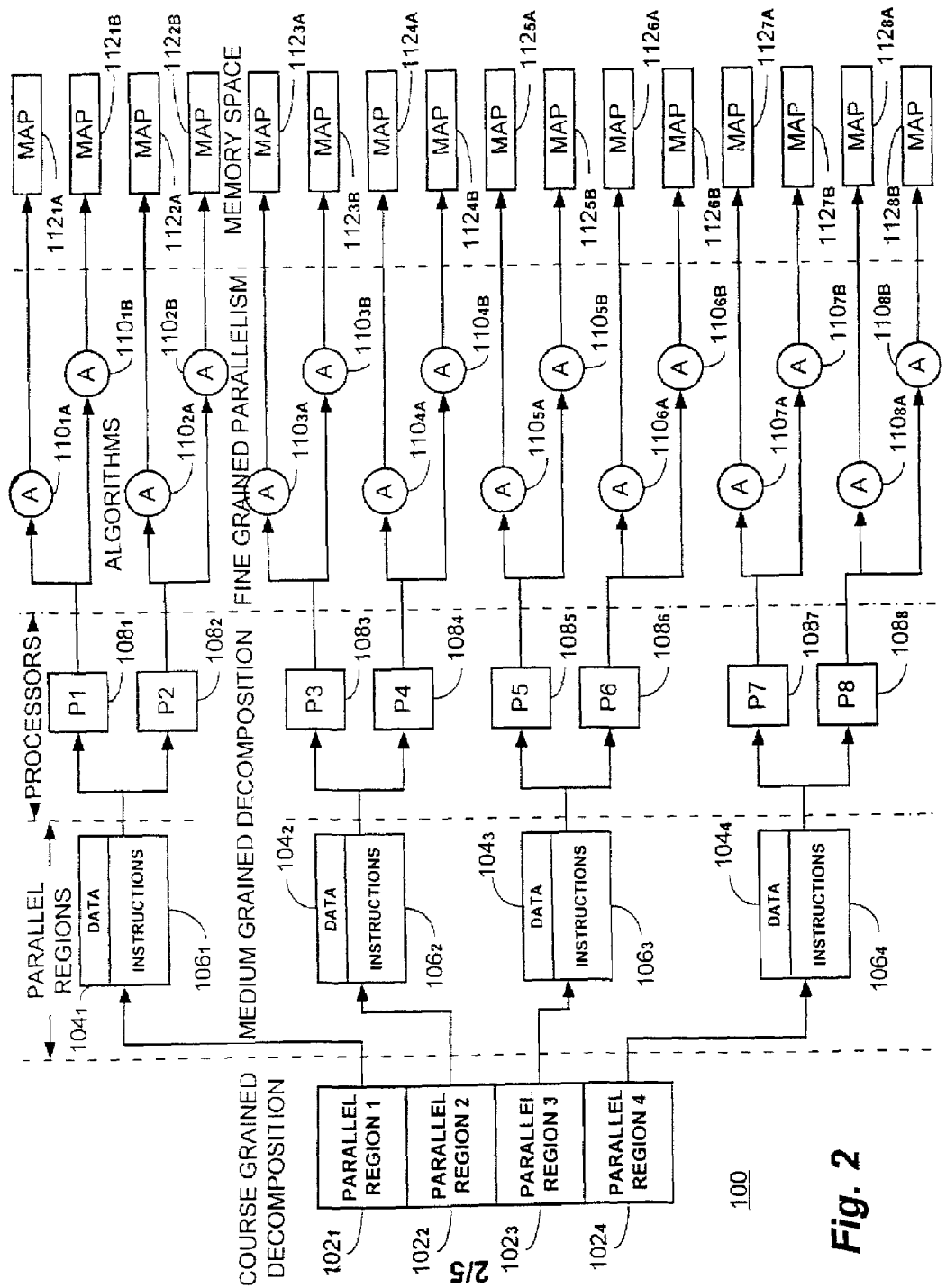
FIG. 2 is a simplified logical block diagram of a possible computer application program decomposition sequence for use in conjunction with a multiprocessor computer architecture utilizing a number of MAP elements located, for example, in the computer system memory space.

With reference now to FIG. 2, a representative application program decomposition for a multiprocessor computer architecture 100 incorporating a plurality of multi-adaptive processor elements 112 in accordance with the present invention is shown. The computer architecture 100 is operative in response to user instructions and data which, in a coarse grained portion of the decomposition, are selectively directed to one of (for purposes of example only) four parallel regions $102_1$ through $102_4$ inclusive. The instructions and data output from each of the parallel regions $102_1$ through $102_4$ are respectively input to parallel regions segregated into data areas $104_1$ through $104_4$ and instruction areas $106_1$ through $106_4$. Data maintained in the data areas $104_1$ through $104_4$ and instructions maintained in the instruction areas $106_1$ through $106_4$ are then supplied to, for example, corresponding pairs of processors $108_1$, $108_2$ (P1 and P2); $108_3$, $108_4$ (P3 and P4); $108_5$, $108_6$ (P5 and P6); and $108_7$, $108_8$ (P7 and P8) as shown. At this point, the medium grained decomposition of the instructions and data has been accomplished.

A fine grained decomposition, or parallelism, is effectuated by a further algorithmic decomposition wherein the output of each of the processors $108_1$ through $108_8$, is broken up, for example, into a number of fundamental algorithms $110_{1A}$, $110_{1B}$, $110_{2A}$, $110_{2B}$ through $110_{8B}$ as shown. Each of the algorithms is then supplied to a corresponding one of the MAP elements $112_{1A}$, $112_{1B}$, $112_{2A}$, $112_{2B}$, through $112_{8B}$ which may be located in the memory space of the computer architecture 100 for execution therein as will be more fully described hereinafter.

Figure 3:
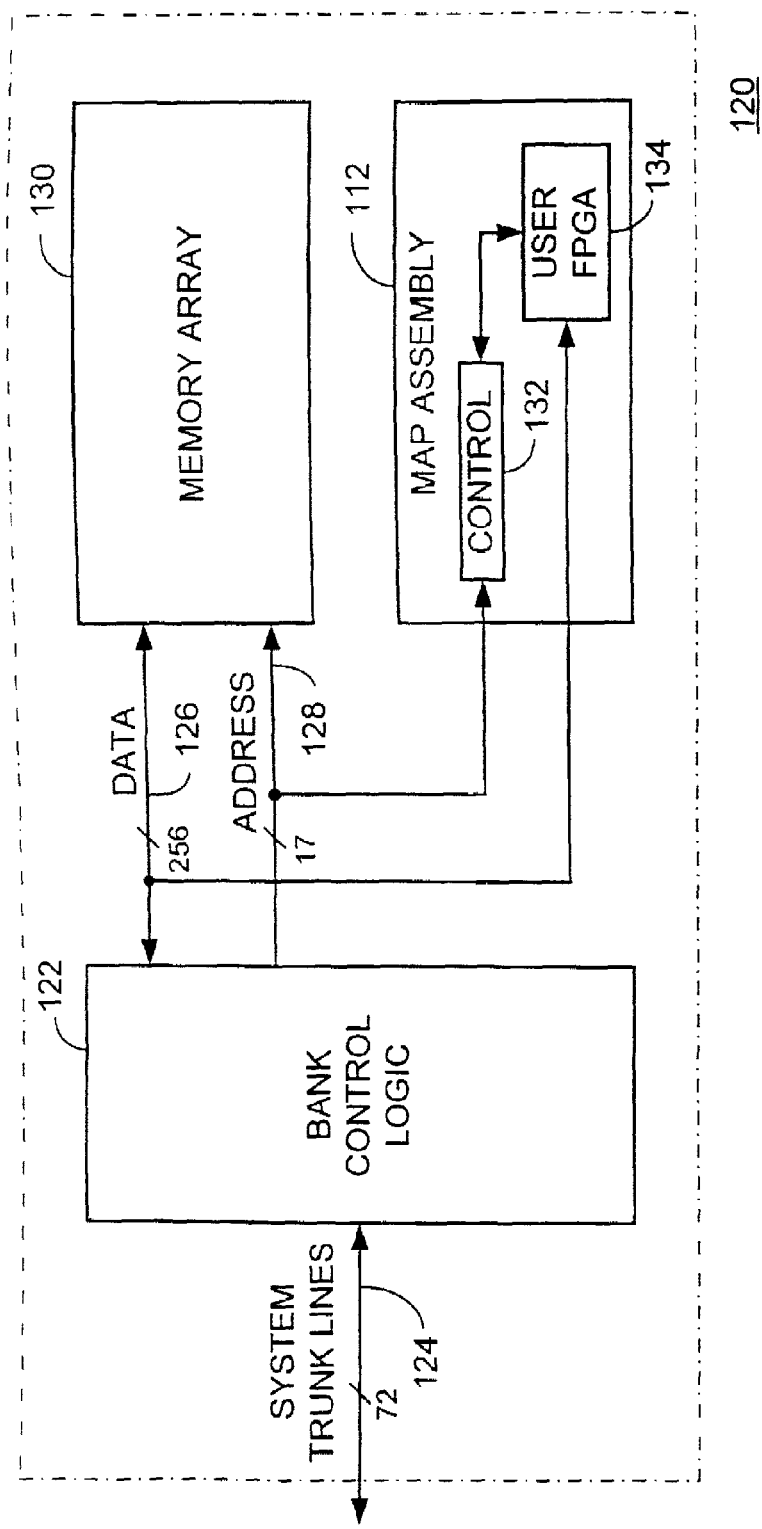
FIG. 3 is a more detailed functional block diagram of an exemplary individual one of the MAP elements of the preceding figures and illustrating the bank control logic, memory array and MAP assembly thereof.

With reference additionally now to FIG. 3, an exemplary implementation of a memory bank 120 in a MAP element-based system computer architecture 100 is shown for a representative one of the MAP elements 112 illustrated in the preceding figure. Each memory bank 120 includes a bank control logic block 122 bi-directionally coupled to the computer system trunk lines, for example, a 72 line bus 124. The bank control logic block 122 is coupled to a bi-directional data bus 126 (for example 256 lines) and supplies addresses on an address bus 128 (for example 17 lines) for accessing data at specified locations within a memory array 130.

The data bus 126 and address bus 128 are also coupled to a MAP element 112. The MAP element 112 comprises a control block 132 coupled to the address bus 128. The control block 132 is also bi-directionally coupled to a user field programmable gate array ("FPGA") 134 by means of a number of signal lines 136. The user FPGA 134 is coupled directly to the data bus 126. In a particular embodiment, the FPGA 134 may be provided as a Lucent Technologies OR3T80 device.

The exemplary computer architecture 100 comprises a multiprocessor system employing uniform memory access across common shared memory with one or more MAP elements 112 which may be located in the memory subsystem, or memory space. As previously described, each MAP element 112 contains at least one relatively large FPGA 134 that is used as a reconfigurable functional unit. In addition, a control block 132 and a preprogrammed or dynamically programmable configuration ROM (as will be more fully described hereinafter) contains the information needed by the reconfigurable MAP element 112 to enable it to perform a specific algorithm. It is also possible for the user to directly download a new configuration into the FPGA 134 under program control, although in some instances this may consume a number of memory accesses and might result in an overall decrease in system performance if the algorithm was short-lived.

FPGAs have particular advantages in the application shown for several reasons. First, commercially available FPGAs now contain sufficient internal logic cells to perform meaningful computational functions. Secondly, they can operate at bus speeds comparable to microprocessors, which eliminates the need for speed matching buffers. Still further, the internal programmable routing resources of FPGAs are now extensive enough that meaningful algorithms can now be programmed without the need to reassign the locations of the input/output ("I/O") pins.

By, for example, placing the MAP element 112 in the memory subsystem or memory space, it can be readily accessed through the use of memory "read" and "write" commands, which allows the use of a variety of standard operating systems. In contrast, other conventional implementations may propose placement of any reconfigurable logic in or near the processor, however these conventional implementations are generally much less effective in a multiprocessor environment because only one processor may have rapid access to it. Consequently, reconfigurable logic must be placed by every processor in a multiprocessor system, which increases the overall system cost. Because a MAP element 112 has DMA capability, (allowing it to write to memory), and because it receives its operands via writes to memory, it is possible to allow a MAP element 112 to feed results to another MAP element 112 through use of a chain port. This is a very powerful feature that allows for very extensive pipelining and parallelizing of large tasks, which permits them to complete faster.

Many of the algorithms that may be implemented will receive an operand and require many clock cycles to produce a result. One such example may be a multiplication that takes 64 clock cycles. This same multiplication may also need to be performed on thousands of operands. In this situation, the incoming operands would be presented sequentially so that while the first operand requires 64 clock cycles to produce results at the output, the second operand, arriving one clock cycle later at the input, will show results one clock cycle later at the output. Thus, after an initial delay of 64 clock cycles, new output data will appear on every consecutive clock cycle until the results of the last operand appears. This is called "pipelining".

In a multiprocessor system, it is quite common for the operating system to stop a processor in the middle of a task, reassign it to a higher priority task, and then return it, or another, to complete the initial task. When this is combined with a pipelined algorithm, a problem arises (if the processor stops issuing operands in the middle of a list and stops accepting results) with respect to operands already issued but not yet through the pipeline. To handle this issue, a solution involving the combination of software and hardware as disclosed in the aforementioned patents and patent applications.

To make use of any type of conventional reconfigurable hardware, the programmer could embed the necessary commands in his application program code. The drawback to this approach is that a program would then have to be tailored to be specific to the MAP hardware. The system disclosed eliminates this problem. Multiprocessor computers often use software called parallelizers. The purpose of this software is to analyze the user's application code and determine how best to split it up among the processors. The technique disclosed provides significant advantages over a conventional parallelizer and enables it to recognize portions of the user code that represent algorithms that exist in MAP elements 112 for that system and to then treat the MAP element 112 as another computing element. The parallelizer then automatically generates the necessary code to utilize the MAP element 112. This allows the user to write the algorithm directly in his code, allowing it to be more portable and reducing the knowledge of the system hardware that he has to have to utilize the MAP element 112.

Figure 4:
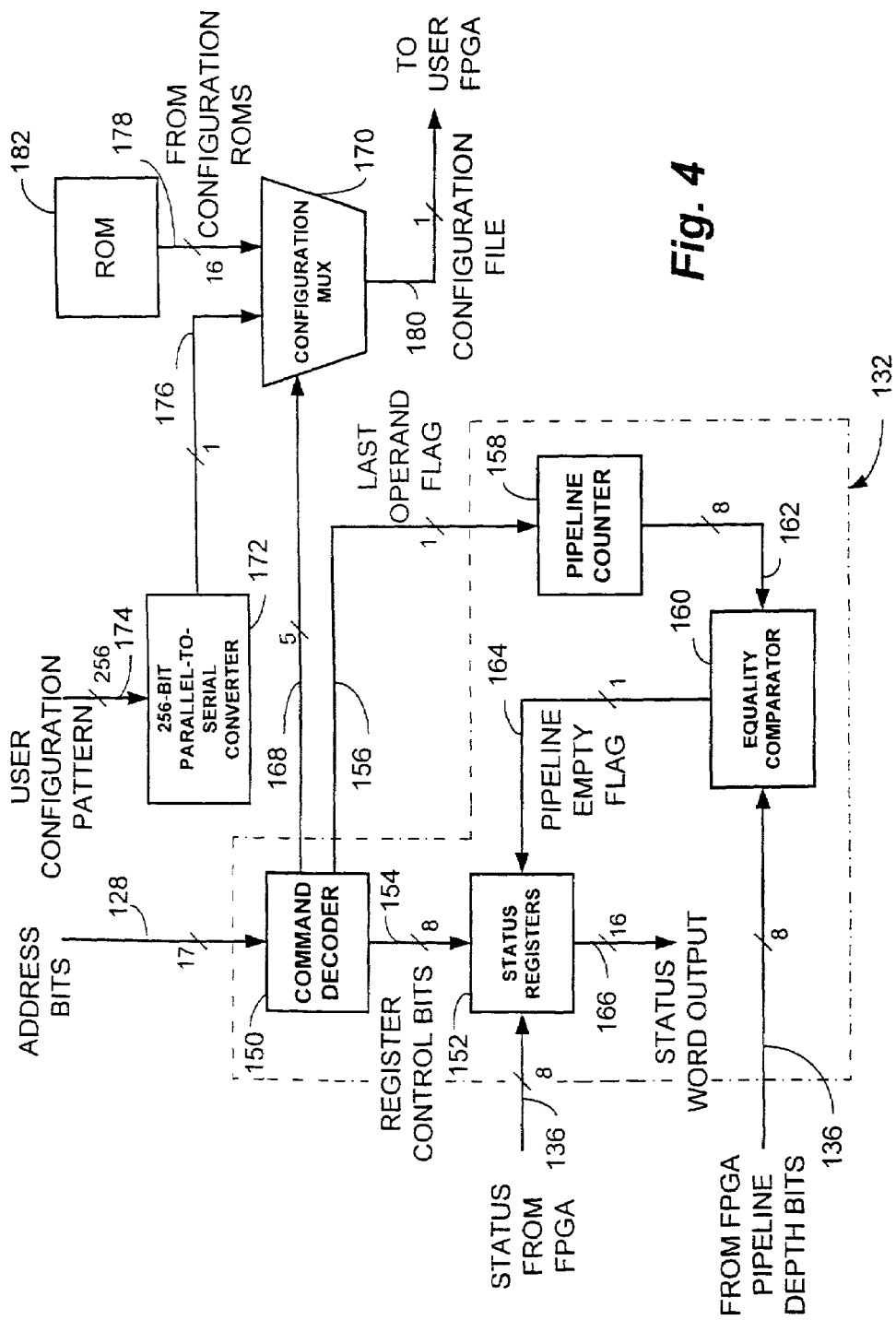
FIG. 4 is a more detailed functional block diagram of the control block of the MAP assembly of the preceding illustration illustrating its interconnection to the user FPGA thereof in a particular embodiment.

With reference additionally now to FIG. 4, a block diagram of the MAP control block 132 is shown in greater detail. The control block 132 is coupled to receive a number of command bits (for example, 17) from the address bus 128 at a command decoder 150. The command decoder 150 then supplies a number of register control bits to a group of status registers iS2 on an eight bit bus 154. The command decoder 150 also supplies a single bit last operand flag on line 156 to a pipeline counter 158. The pipeline counter 158 supplies an eight bit output to an equality comparator 160 on bus 162. The equality comparator 160 also receives an eight bit signal from the FPGA 134 on bus 136 indicative of the pipeline depth. When the equality comparator 160 determines that the pipeline is empty, it provides a single bit pipeline empty flag on line 164 for input to the status registers 152. The status registers 152 are also coupled to receive an eight bit status signal from the FPGA 134 on bus 136 and it produces a sixty four bit status word output on bus 166 in response to the signals on bus 136, 154 and line 164.

The command decoder 150 also supplies a five bit control signal on line 168 to a configuration multiplexer ("MUX") 170 as shown. The configuration MUX 170 receives a single bit output of a 256 bit parallel-serial converter 172 on line 176. The inputs of the 256 bit parallel-to-serial converter 172 are coupled to a 256 bit user configuration pattern bus 174. The configuration MUX 170 also receives sixteen single bit inputs from the configuration ROMs (illustrated as ROM 182) on bus 178 and provides a single bit configuration file signal on line 180 to the user FPGA 134 as selected by the control signals from the command decoder 150 on the bus 168.

In operation, when a processor 108 is halted by the operating system, the operating system will issue a last operand command to the MAP element 112 through the use of command bits embedded in the address field on bus 128. This command is recognized by the command decoder 150 of the control block 132 and it initiates a hardware pipeline counter 158. When the algorithm was initially loaded into the FPGA 134, several output bits connected to the control block 132 were configured to display a binary representation of the number of clock cycles required to get through its pipeline (i.e. pipeline "depth") on bus 136 input to the equality comparator 160. After receiving the last operand command, the pipeline counter 158 in the control block 132 counts clock cycles until its count equals the pipeline depth for that particular. algorithm. At that point, the equality comparator 160 in the control block 132 de-asserts a busy bit on line 164 in an internal group of status registers 152. After issuing the last operand signal, the processor 108 will repeatedly read the status registers 152 and accept any output data on bus 166. When the busy flag is de-asserted, the task can be stopped and the MAP element 112 utilized for a different task. It should be noted that it is also possible to leave the MAP element 112 configured, transfer the program to a different processor 108 and restart the task where it left off.

In order to evaluate the effectiveness of the use of the MAP element 112 in a given application, some form of feedback to the use is required. Therefore, the MAP element 112 may be equipped with internal registers in the control block 132 that allow it to monitor efficiency related factors such as the number of input operands versus output data, the number of idle cycles over time and the number of system monitor interrupts received over time. One of the advantages that the MAP element 112 has is that because of its reconfigurable nature, the actual function and type of function that are monitored can also change as the algorithm changes. This provides the user with an almost infinite number of possible monitored factors without having to monitor all factors all of the time.

Figure 5:
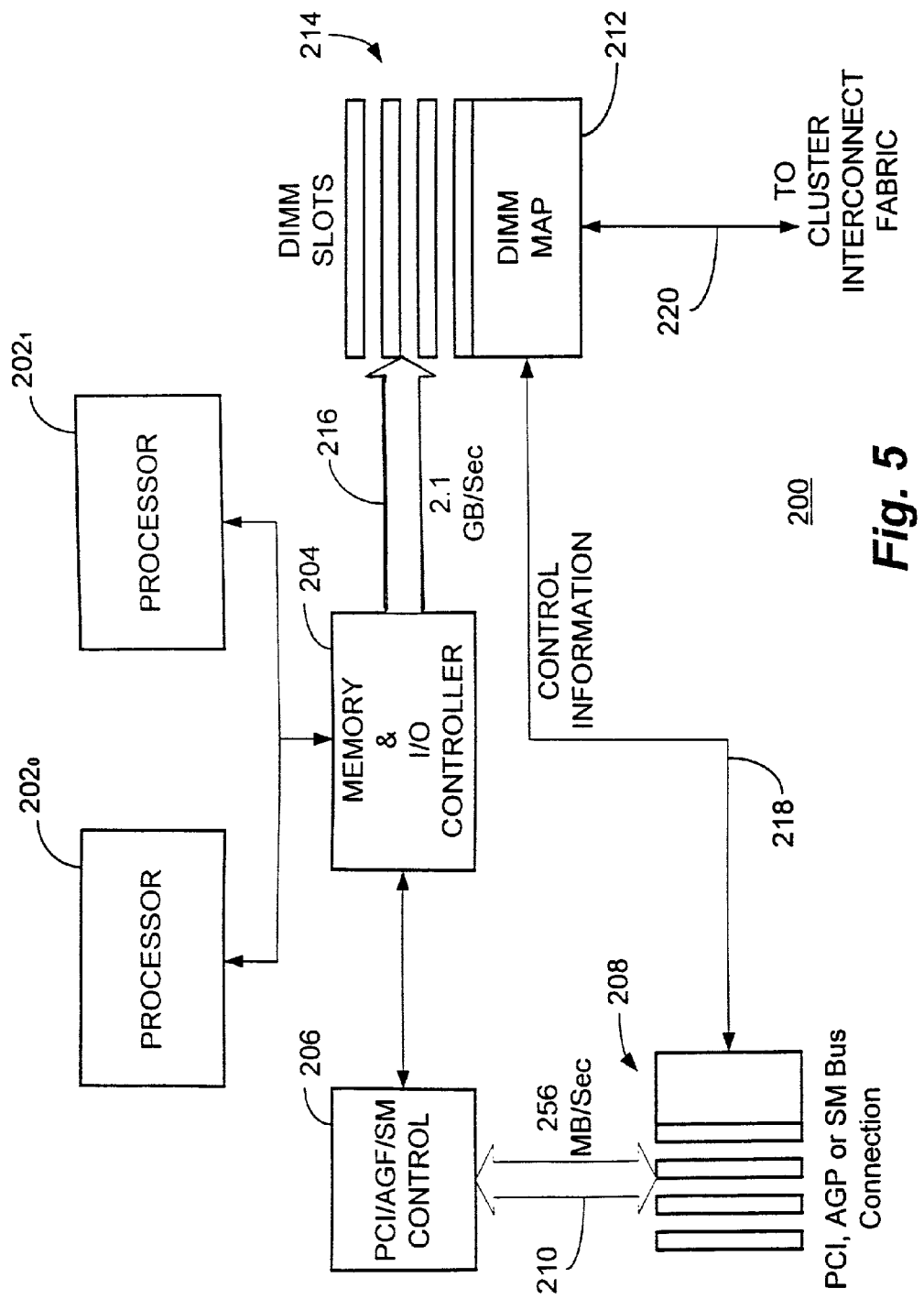
FIG. 5 is a functional block diagram of an exemplary embodiment of the present invention comprising a switch/network adapter port for clustered computers employing a chain of multi-adaptive processors in a DIMM format to significantly enhance data transfer rates over that otherwise available from the peripheral component interconnect ("PCI") bus.

With reference additionally now to FIG. 5, a functional block diagram of an exemplary embodiment of a computer system 200 in accordance with the present invention is shown comprising a switch/network adapter port for clustered computers employing a chain of multi-adaptive processors in a DIMM format to significantly enhance data transfer rates over that otherwise available from the peripheral component interconnect ("PCI") bus.

In the particular embodiment illustrated, the computer system 200 includes one or more processors 202$_0$ and 202$_1$ which are coupled to an associated PC memory and I/O controller 204. In operation, the controller 204 sends and receives control information from a PCI control block 206. It should be noted that in alternative implementations of the present invention, the control block 206 may also be an AGP or SM control block. The PCI control block 206 is coupled to one or more PCI card slots 208 by means of a relatively low bandwidth PCI bus 210 which allows data transfers at a rate of substantially 256 MB/sec. In the alternative embodiments of the present invention mentioned above, the card slots 208 may alternatively comprise accelerated graphics port ("AGP") or system maintenance ("SM") bus connections.

The controller 204 is also conventionally coupled to a number of DIMM slots 214 by means of a much higher bandwidth DIMM bus 216 capable of data transfer rates of substantially 2.1 GB/sec. or greater. In accordance with a particular implementation of the present invention, a DIMM MAP element 212 is associated with, or physically located within, one of the DIMM slots 214. Control information to or from the DIMM MAP element 212 is provided by means of a connection 218 interconnecting the PCI bus 210 and the DIMM MAP element 212. The DIMM MAP element 212 then may be coupled to another clustered computer MAP element by means of a cluster interconnect fabric connection 220 connected to the MAP chain ports. As previously noted, the DIMM MAP element 212 may also comprise a RIMM MAP element.

Since the DIMM memory located within the DIMM slots 214 comprises the primary storage location for the PC microprocessor(s) 202$_0$, 202$_1$, it is designed to be electrically very "close" to the processor bus and thus exhibit very low latency. As noted previously, it is not uncommon for the latency associated with the DIMM to be on the order of only 25% of that of the PCI bus 210. By, in essence, harnessing this bandwidth as an interconnect between computer systems 200, greatly increased cluster performance may be realized.

To this end, by placing the DIMM MAP element 212 in one of the PC's DIMM slots 214, its FPGA 134 (FIG. 3) could accept the normal memory "read" and "write" transactions and convert them to a format used by an interconnect switch or network. As disclosed in the aforementioned patents and patent applications, each MAP element 212 includes chain ports to enable it to be coupled to other MAP elements 212. Through the utilization of the chain port to connect to the external clustering fabric over connection 220, data packets can then be sent to remote nodes where they can be received by an identical board. In this particular application, the DIMM MAP element 212 would extract the data from the packet and store it until needed by the receiving processor 202.

This technique results in the provision of data transfer rates several times higher than that of any currently available PC interface such as the PCI bus 210. However, the electrical protocol of the DIMMs is such that once the data arrives at the receiver, there is no way for a DIMM module within the DIMM slots 214 to signal the microprocessor 202 that it has arrived, and without this capability, the efforts of the processors 202 would have to be synchronized through the use of a continued polling of the DIMM MAP elements 212 to determine if data has arrived. Such a technique would totally consume the microprocessor 202 and much of its bus bandwidth thus stalling all other bus agents.

To avoid this situation, the DIMM MAP element 212 may be further provided with the connection 218 to allow it to communicate with the existing PCI bus 210 which could then generate communications packets and send them via the PCI bus 210 to the processor 202. Since these packets would account for but a very small percentage of the total data moved, the low bandwidth effects of the PCI bus 210 are minimized and conventional PCI interrupt signals could also be utilized to inform the processor 202 that data has arrived. In accordance with another implementation of the present invention, the system maintenance ("SM") bus (not shown) could also be used to signal the processor 202. The SM bus is a serial current mode bus that conventionally allows various devices on the processor board to interrupt the processor 202. In an alternative embodiment, the accelerated graphics port ("AGP") may also be utilized to signal the processor 202.

With a DIMM MAP element 212 associated with what might be an entire DIMM slot 214, the PC will allocate a large block of addresses, typically on the order of 1 GB, for use by the DIMM MAP element 212. While some of these can be decoded as commands, (as disclosed in the aforementioned patents and patent applications) many can still be used as storage. By having at least as many address locations as the normal input/output ("I/O") block size used to transfer data from peripherals, the conventional Intel™ chip sets used in most PCs (including controller 204) will allow direct I/O transfers into the DIMM MAP element 212. This then allows data to arrive from, for example, a disk and to pass directly into a DIMM MAP element 212. It then may be altered in any fashion desired, packetized and transmitted to a remote node over connection 220. Because both the disk's PCI bus 210 and the DIMM MAP element 212 and DIMM slots 214 are controlled by the PC memory controller 204, no processor bus bandwidth is consumed by this transfer.

It should also be noted that in certain PCs, several DIMMs within the DIMM slots 214 may be interleaved to provide wider memory access capability in order to increase memory bandwidth. In these systems, the previously described technique may also be utilized concurrently in several DIMM slots 214. Nevertheless, regardless of the particular implementation chosen, the end result is a DIMM-based MAP element 212 having one or more connections to the PCI bus 210 and an external switch or network over connection 220 which results in many times the performance of a PCI-based connection alone as well as the ability to process data as it passes through the interconnect fabric.

While there have been described above the principles of the present invention in conjunction with a specific computer architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computer system comprising:
    at least one processor;
    a controller for coupling said at least one processor to a peripheral bus control block and a memory module bus;
    at least one peripheral bus slot coupled to said peripheral bus control block by a peripheral bus;
    at least one memory module slot coupled to said memory module bus; and
    a processor element associated with said at least one memory module slot for providing a direct data connection between an external device coupled thereto and the memory module slot enabling data exchange directly between the external device and the memory module bus, wherein the processor element exchanges data at memory module bus speeds.

2. The computer system of claim 1 further comprising:
    a control connection to said processor element coupled to said peripheral bus for indicating to said at least one processor an arrival of data on said direct data connection to said processor element and memory module bus.

3. The computer system of claim 1 wherein said memory module bus comprises a DIMM bus and wherein said processor element comprises a DIMM physical format for retention within said at least one memory module slot.

4. The computer system of claim 1 wherein said memory module bus comprises a in-line memory module serial interface bus and wherein said processor element comprises a in-line memory module serial interface physical format for retention within said at least one memory module slot.

5. The computer system of claim 1 wherein said external device comprises one of another computer system, switch or network.

6. The computer system of claim 1 wherein said processor element is operative to alter data received from said controller on said memory module bus prior to transmission on said data connection to said external device.

7. The computer system of claim 1 wherein said processor element is operative to alter data received on said data connection from said external device prior to transmission to said controller on said memory module bus.

8. The computer system of claim 1 wherein said processor element comprises:
    a field programmable gate array configurable to perform an identified algorithm on an operand provided thereto on said memory module bus and said data connection.

9. A computer system comprising:
    at least one processor;
    a controller for coupling said at least one processor to a graphics control block and a memory module bus;
    at least one graphics bus connection coupled to said graphics control block by a graphics bus;
    at least one memory module slot coupled to said memory module bus; and
    a processor element associated with said at least one memory module slot for providing a direct data connection between an external device coupled thereto and the memory module slot enabling data exchange directly between the external device and the memory module bus wherein access to the processor element by the controller occurs at memory module bus speeds.

10. The computer system of claim 9 further comprising:
    a control connection to said processor element coupled to said graphics bus for indicating to said at least one processor an arrival of data on said direct data connection to said processor element and memory module bus.

11. The computer system of claim 9 wherein said memory module bus comprises a DIMM bus and wherein said processor element comprises a DIMM physical format for retention within said at least one memory module slot.

12. The computer system of claim 9 wherein said memory module bus comprises a in-line memory module serial interface bus and wherein said processor element comprises a in-line memory module serial interface physical format for retention within said at least one memory module slot.

13. The computer system of claim 9 wherein said processor element is operative to alter data received from said controller on said memory module bus prior to transmission on said data connection to said external device.

14. The computer system of claim 9 wherein said processor element is operative to alter data received on said data connection from said external device prior to transmission to said controller on said memory module bus.

15. The computer system of claim 9 wherein said processor element comprises:
a field programmable gate array configurable to perform an identified algorithm on an operand provided thereto on said memory module bus and said data connection.

16. The computer system of claim 9 wherein said at least one processor comprises a plurality of processors.

17. A computer system comprising:
at least one processor;
a controller for coupling said at least one processor to a system maintenance control block and a memory module bus;
at least one system maintenance bus connection coupled to said system maintenance control block by a system maintenance bus;
at least one memory module slot coupled to said memory module bus; and
a processor element associated with said at least one memory module slot for providing a direct data connection between an external device coupled thereto and the memory module slot enabling data exchange directly between the external device and the memory module bus wherein access to the processor element by the controller for data exchange occurs at bus speeds substantially equal to that of the at least one microprocessor.

18. The computer system of claim 17 further comprising:
a control connection to said processor element coupled to said system maintenance bus for indicating to said at least one processor an arrival of data on said direct data connection to said processor element and memory module bus.

19. The computer system of claim 17 wherein said memory module bus comprises a DIMM bus and wherein said processor element comprises a DIMM physical format for retention within said at least one memory module slot.

20. The computer system of claim 17 wherein said memory module bus comprises a in-line memory module serial interface bus and wherein said processor element comprises a in-line memory module serial interface physical format for retention within said at least one memory module slot.

21. The computer system of claim 17 wherein said external device comprises one of another computer system, switch or network.

22. The computer system of claim 17 wherein said processor element is operative to alter data received from said controller on said memory module bus prior to transmission on said data connection to said external device.

23. The computer system of claim 17 wherein said processor element is operative to alter data received on said data connection from said external device prior to transmission to said controller on said memory module bus.

24. The computer system of claim 17 wherein said processor element comprises:
a field programmable gate array configurable to perform an identified algorithm on an operand provided thereto on said memory module bus and said data connection.

* * * * *